Patented May 15, 1923.

1,455,254

UNITED STATES PATENT OFFICE.

MAX KAHN, OF NEW YORK, N. Y., ASSIGNOR TO INTARVIN CO. INC., A CORPORATION OF NEW YORK.

UTILIZATION OF EDIBLE FATS.

No Drawing. Application filed November 19, 1921. Serial No. 516,321.

*To all whom it may concern:*

Be it known that I, MAX KAHN, a citizen of the United States, residing in the borough of Manhattan, city, county, and State of New York, have invented certain Improvements Relating to the Utilization of Edible Fats, of which the following is a full, clear, and exact description.

My invention is based upon the discovery by me that edible fats of the characteristic hereinafter set forth, may be employed for human consumption under circumstances and in conditions where ordinary edible fats cannot be safely used. There are conditions in human beings in which the indigestion of fats and oils causes the formation of toxic substances and the production of acidosis. This is particularly the case in diabetes.

All natural edible fats contain fatty acids with an even number of carbon atoms in the molecule; for instance, stearic acid ($C_{18}H_{36}O_2$), palmitic acid ($C_{16}H_{32}O_2$), etc. I have discovered that while the use of an edible fat containing fatty acids with an even number of carbon atoms in the molecule will produce acidosis in cases of diabetes, fats containing fatty acids with an odd number of carbon atoms in their molecules do not cause acidosis and hence may be used with safety in such cases. Such acids are, for instance, undecylic acid ($C_{11}H_{22}O_2$), tridecylic acid ($C_{13}H_{26}O_2$), pentadecylic acid ($C_{15}H_{30}O_2$), heptadecylic acid or margaric acid ($C_{17}H_{34}O_2$), and nondicylic acid ($C_{19}H_{38}O_2$), and so on.

The existence of these fats, containing fatty acids with an odd number of carbon atoms in their molecules, in natural edible fats and oils is doubtful. If they do exist their proportion is inconsiderable and insufficient to substantially modify the harmful effect of such natural fats in the respect referred to. Fats containing fatty acids with an odd number of carbon atoms in their molecules are known and have been prepared artificially by methods described in chemical literature. (See articles by F. Krafft, in Berichte d. Deutsch. Chem. Gesell, 1879). They have hitherto been made only for purposes of chemical investigation and as an academic exercise and not for nutritional experiment.

Having now described my invention or discovery, what I claim and desire to secure by Letters Patent is as follows:

1. As an improvement in the art of treating or combating acidosis, in cases in which the use of ordinary fats is contraindicated or limited, the use or a product comprising or containing fatty acids having an odd number of carbon atoms in their molecules, as set forth.

2. As an improvement in the art of treating or combating acidosis, in cases in which the use of ordinary fats is contraindicated or limited, the use of a product comprising or containing fatty acids having an odd number of carbon atoms, from eleven to nineteen respectively, in their molecules, as set forth.

This specification signed and witnessed this seventeenth day of November, 1921.

MAX KAHN.

Witnesses:
HAROLD OMAR NOLAN,
MORRIS H. KAHN.

Certificate of Correction.

It is hereby certified that in Letters Patent No. 1,455,254, granted May 15, 1923, upon the application of Max Kahn, of New York, N. Y., for an improvement in "Utilization of Edible Fats," errors appear in the printed specification requiring correction as follows: Line 15, for the word "indigestion" read *ingestion*, and line 59, for the word "or", second occurrence, read *of;* and that the said Letters Patent should be read with these corrections therein that the same may conform to the record of the case in the Patent Office.

Signed and sealed this 26th day of June, A. D., 1923.

[SEAL.]                                           KARL FENNING,
*Acting Commissioner of Patents.*